United States Patent [19]

Anjos et al.

[11] Patent Number: 5,410,781
[45] Date of Patent: May 2, 1995

[54] CONSTANT TENSION CLAMP

[75] Inventors: Theodore R. Anjos, Smyrna; Michael H. Reese, Murfreesboro; Watkins Crockett, IV, Franklin; Gene C. Holz, Murfreesboro; Frank Segato, Smyrna, all of Tenn.

[73] Assignee: Tridon Limited, Burlington, Canada

[21] Appl. No.: 165,292

[22] Filed: Dec. 13, 1993

[51] Int. Cl.6 .............................................. F16L 33/08
[52] U.S. Cl. .................................................. 24/274 R
[58] Field of Search .......... 24/274 R, 274 P, 274 WB, 24/279, 20 S, 20 LS

[56] References Cited

U.S. PATENT DOCUMENTS

| | | | |
|---|---|---|---|
| 2,522,494 | 9/1950 | Baldo | 24/274 R |
| 2,825,113 | 3/1958 | Schaeter | 24/274 R |
| 4,819,307 | 4/1989 | Turner | 24/274 |
| 5,170,540 | 12/1992 | Oetiker | 24/279 X |

FOREIGN PATENT DOCUMENTS

| | | | |
|---|---|---|---|
| 4108852 | 9/1992 | Germany | 24/279 |
| WO80/01199 | 6/1980 | WIPO | 24/274 R |

*Primary Examiner*—James R. Brittain
*Attorney, Agent, or Firm*—Rogers & Scott

[57] ABSTRACT

A hose clamp is provided for compressing a hose radially to hold the hose on a pipe. The clamp has a band for wrapping about the hose over the pipe and includes a first end and a free end. Angled slots extend in parallel adjacent the free end and a housing is attached to the first end and includes first and second end walls. An adjustment screw passes through the first end wall and extends generally in parallel with respect to the bands, the screw being contained within the housing at all times but for a head and a part of a shank adjacent the head. The head is operable to rotate the screw which has a thread in engagement with the angled slots so that rotation of the screw will adjust the band about a hose. The screw also includes a thrust surface adjacent the thread and remote from the head and a helical coil spring is contained in the housing in alignment with the screw and in compressive engagement between the thrust surface and the second end wall. An end piece on the screw engages into the spring sufficient to locate the spring and the screw about a common axis. As a result, after the screw has been rotated to tighten the band, the screw can subsequently be further rotated to compress the helical coil spring and thereby store energy in the spring for use in automatically tightening the clamp should the hose creep to a smaller diameter.

3 Claims, 2 Drawing Sheets

CONSTANT TENSION CLAMP

FIELD OF THE INVENTION

This invention relates to hose clamps and more particularly to a constant load hose clamp which stores energy when it is applied to a hose to accommodate creep in the hose.

BACKGROUND OF THE INVENTION

In many applications, particularly in the cooling system of internal combustion engines, hoses for various purposes are clamped to pipes or pipe nipples and are subjected to vibrations and to varying temperatures every time the engine is used. Consequently, during its life, a hose is subjected to loads and to repeated heating and cooling with resulting changes in stresses in the hose. This will tend to result in what is known as "compression set" or "plastic creep" in the hose. These terms are used to describe the tendency for the material of the hose to flow away from the clamp band leaving less material under the band so that the band will become too loose to seal the hose to the pipe. It is therefore desirable to provide a clamp which applies a substantially constant radial load on the hose as the hose changes shape under the band.

Prior art clamps, such as the clamp shown in U.S. Pat. No. 4,819,307, have addressed this problem by providing constant tension clamps having bands which are firstly tightened by rotating a worm screw in a housing, and then, once the band is snug around the hose, the screw is further tightened to load a spring to maintain a relatively constant clamping force should the hose reduce in size.

A further consideration in clamp design is to minimize the profile of the clamp so that the clamp is using up as little space as possible around the hose. Clearly the addition of a pre-loaded spring will tend to increase the profile and it is therefore desirable to include a spring arrangement which meets this design criterion. As seen in U.S. Pat. No. 4,819,307, the structure requires that the worm screw extend from both ends of a housing. Consequently, as the clamp is tightened the length of the structure about the housing remains constant and develops projections which are disadvantageous because they tend to snag on other engine components.

Accordingly, it is among the objects of the invention to provide an improved constant load clamp which reduces in profile as the clamp is tightened about a hose.

SUMMARY OF THE INVENTION

In one of its aspects, the invention provides a clamp for compressing a hose radially to hold the hose on a pipe. The clamp has a band for wrapping about the hose over the pipe and includes a first end and a free end. Angled slots extend in parallel adjacent the free end and a housing is attached to the first end and includes first and second end walls. An adjustment screw passes through the first end wall and extends generally in parallel with respect to the bands, the screw being contained within the housing at all times but for a head and a part of a shank adjacent the head. The head is operable to rotate the screw which has a thread in engagement with the angled slots so that rotation of the screw will adjust the band about a hose. The screw also includes a thrust surface adjacent the thread and remote from the head and a resilient compressive element is contained in the housing in alignment with the screw and in compressive engagement between the thrust surface and the second end wall. As a result, after the screw has been rotated to tighten the band, the screw can subsequently be further rotated to compress the element and thereby store energy in the element for use in automatically tightening the clamp should the hose creep to a smaller diameter.

BRIEF DESCRIPTION OF DRAWINGS

The invention will be more fully understood with reference to the following drawings, in which.

DETAILED DESCRIPTION OF A PREFERRED EMBODIMENT

Figure 1:
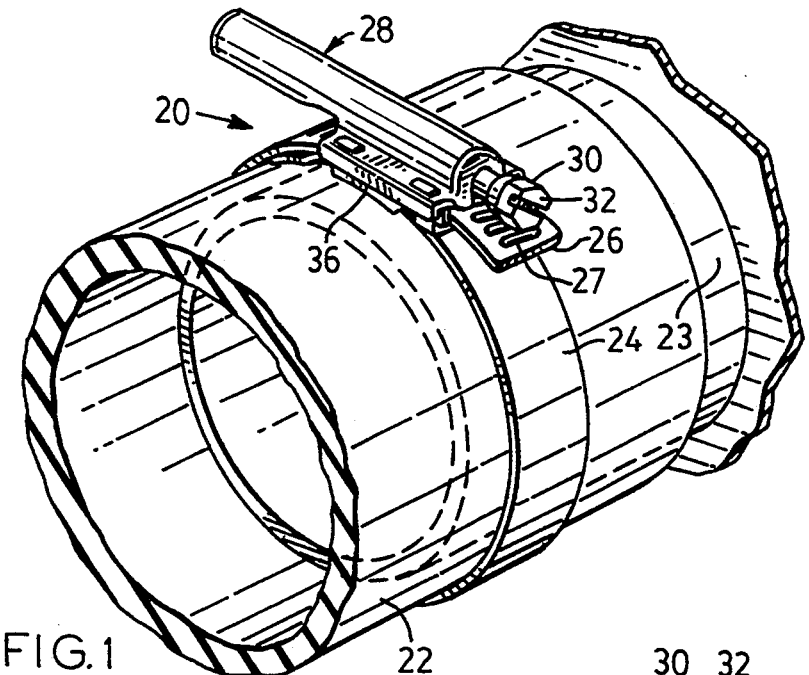
FIG. 1 is a simplified isometric view showing a clamp according to a preferred embodiment of the invention and clamping a hose to a pipe.

Reference is made firstly to FIG. 1 which illustrates a preferred embodiment of hose clamp 20 according to the invention in position about a hose 22 on a pipe 23. The clamp 20 consists of a band 24 encircling the pipe 23 and having a free end 26 defining angled slots 27 for combining with a worm thread on an adjustment screw 30 (as will be described) within a housing 28. Adjustment is made by rotating the adjustment screw 30 using either a screwdriver or wrench on a slotted hexagonal head 32. The screw 30 is mostly contained within housing 28.

To engage the clamp on the pipe 22, the open clamp is wrapped around the pipe in conventional fashion and the free end 26 is slotted into the housing 28 whereupon the screw 30 is rotated to engage the slots 27 and to tighten the clamp. As rotation of the screw 30 continues, the clamp will first tighten and will then store energy within the housing 28 in a coil spring as will be described. The energy in the spring is available to maintain a constant tension in the clamp.

Figure 2:
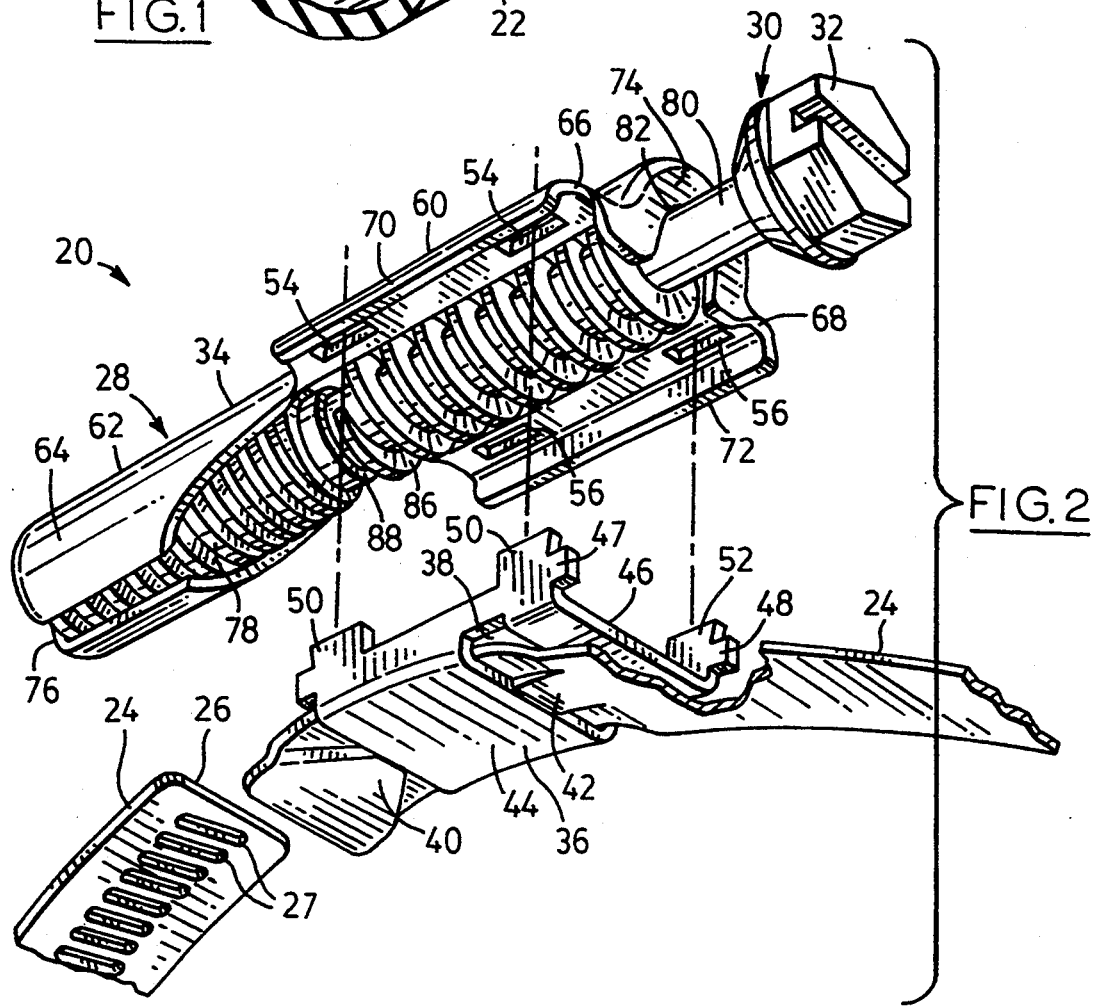
FIG. 2 is an exploded isometric view of the clamp showing a coil spring within a cover for attachment to a base on a band of the clamp.

The clamp will be more fully understood with reference to FIG. 2 which is an exploded view showing the internal parts of the clamp. It can be seen from this view (with some reference to FIG. 1) that the clamp has a housing 28, made up of a cover 34 and a base 36 which is attached permanently to the band 24. Starting at the base, it will be seen that the band is threaded through a slot 38 in the base 36 and that a pair of detents 40, 42 are provided in the band to engage resiliently about a strap 44 forming part of the base 36. A narrower strap 46 combines with the strap 44 to define the slot 38 and is offset from the strap 44 to accommodate the band 24.

The base 36 is completed by a pair of parallel sides 47, 48 each of which includes a pair of tabs 50, 52 (one of which is seen). These tabs are positioned for engagement through two pairs of slots 54, 56 in the housing 28 as will be described.

As also seen in FIG. 2, the one piece housing 28 is essentially two parts in alignment, namely a screw thread housing 60 and a coil spring housing 62. These housings are formed with a common cylindrical wall 64 which, in the case of the screw thread housing, includes a pair of aligned side extensions 66, 68 which define the respective slots 54, 56 and which terminate at parallel side ribs 70, 72 provided to rigidify the structure and to assist location on the base 36.

The screw thread housing 60 extends axially with reference to the bolt 30 from a first end wall 74 adjacent the head 32 of the bolt 30, to meet the screw thread housing 62 which ends at a second end wall 76 defined by the extremity of the cover 34.

As mentioned, the coil spring housing 62 is a continuation of the screw thread housing 60 having a common wall 64 which in the case of the coil spring housing 62 is more fully cylindrical. This permits the coil spring and screw to have similar outside diameters.

Figure 3:
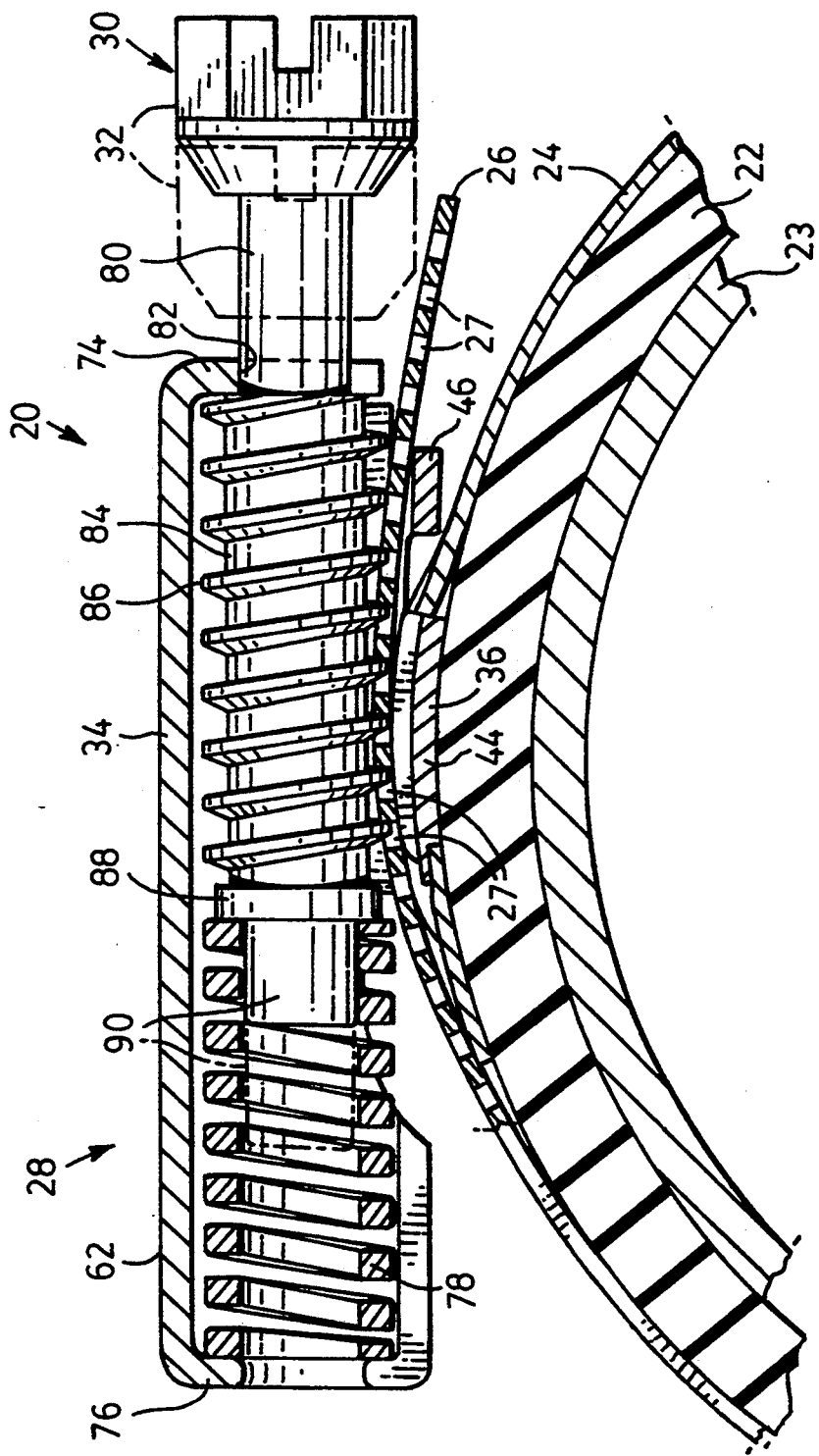
FIG. 3 is a sectional side plan view showing the screw in engagement with a plurality of angled slots in the band.

Reference is now made to FIGS. 2 and 3 to describe the adjustment screw 30 and its position within the housing 28.

The adjustment screw 30 includes a short cylindrical shank 80 extending through a U-shaped opening 82 in the first end wall 74 of the housing 28, and a threaded portion 84 defining a buttress thread 86 in engagement with an inner surface of the wall 74 and extending to a collar 88 which defines a thrust surface in compressive engagement with the coil spring 78. This spring has a square cross-section and defines an inner diameter proportioned to receive a cylindrical end piece 90 on the bolt 30. As a result of this, the bolt 30 is located in the housing by virtue of engagement with the end wall 74 and the spring 78 which is in compression between the collar 88 and the second end wall 76. It should be noted that the ends of the spring are ground to present a flat surface to avoid uneven loading when the spring is compressed.

As also seen in FIG. 3, the buttress thread 86 is in engagement with the band in the angled slots 27. To accommodate this the free end 26 of the band has been engaged through the housing 28 between the cover 58 and the base 36. The band is engaged against the base so that when the adjustment screw 30 is rotated, the helical form of the buttress thread 86 draws the band 24 through the housing 28 thereby tensioning the band around the hose 22 in engagement with the pipe 23. As compression continues, the screw will reach a point where further rotation will not draw the band any further through the housing 28 but will instead begin to compress the spring 78. The screw head 32 will then move generally into the position shown in ghost outline in FIG. 3 as the shank 80 moves through the housing wall 74 guided by opening 82 in the end wall. It will be seen in FIG. 3 that the overall profile of the clamp 20 is reduced by this action because the head has been moved towards the housing 28. As a result of this, the overhang of the housing and screw head will be reduced and the amount of overhang to either side of the band (i.e. with reference to the contact point between the thread 86 and the band 24) will be such that there will be generally the same amount overhanging both sides of this point thereby minimizing the radial extent of the clamp with reference to the center of the hose.

In the event that the hose should creep and the effective outer diameter of the hose be reduced, then the energy stored in the spring 78 will come into play to move the screw back towards its original position thereby further tensioning the band 24 around the hose 22. Periodic maintenance may be necessary to return the screw to the ghost outline position, but in many circumstances it will not be necessary because the energy in the spring will take care of the small variations in the hose.

The clamp design provides for ease of assembly. The coil spring housing 62 (FIG. 2) is shaped to contain and restrain the spring 78, whereas the screw thread housing requires the base 36 to contain the screw 30. As a result, to assemble the clamp, the spring is first slipped into the cover 34 by positioning the spring where the screw is shown in FIG. 2 and then sliding the spring axially into contact with end wall 76. Next the end piece 90 (FIG. 3) of the screw 30 is engaged in the spring and, using a slight compressive force, the screw is pushed into position against the spring and rotated slightly in the position shown in FIG. 2. The resulting sub-assembly is then added to a second sub-assembly of the base and band which have been snapped together about detents 40, 42 by positioning the cover 34 on the tabs 50, 52 which are then crimped to lock the cover 34 on the base 36.

Final assembly is done by wrapping the band 24 (FIG. 1) about a hose such as hose 22 and the free end 26 of the band is engaged in the housing and engaged by rotating the screw 30.

It will be evident that variations can be made to the preferred embodiment. For instance the compression spring could be replaced by any suitable resilient compressive element such as a suitable elastomeric material. The details of the assembly, such as the number of tabs 50, 52 could also be changed; the angled slots 27 could be changed to match a suitable thread; and the spring cross-section could be varied. All these, as well as other modifications are within the scope of the invention as described and claimed.

I claim:

1. A hose clamp for compressing a hose radially to hold the hose on a pipe, the clamp comprising:
   a band for wrapping about the hose over the pipe and having a first end and a free end, the band defining parallel angled slots adjacent the free end;
   a clamp housing including a base attached to said first end and a cover having a screw thread housing and a coil spring housing, the screw thread housing and the coil spring housing being aligned about a common axis and the screw thread housing being cylindrical and tubular, the cover further including a first end wall forming part of the screw thread housing and a second end wall forming part of the coil spring housing;
   means coupling the cover to the base with said common axis being spaced from and extending generally parallel to the band;
   a helical coil spring contained and located in the coil spring housing;
   an adjustment screw passing through the first end wall, the screw having a head operable to rotate the screw, a thread in engagement with the angled slots so that rotation of the screw will adjust the band about a hose, a shank between the thread and the head and part of the shank and the head projecting outside the clamp housing, a thrust surface adjacent the thread and remote from the head and a short end piece at an end of the screw from the head, the end piece being engaged inside an adjacent end of the helical coil spring to locate the coil spring and the screw about said axis and terminating inside the coil spring remote from the second end wall; and
   the helical coil spring being in alignment with the screw and in compressive engagement between the thrust surface and the second end wall so that after the screw has been rotated to tighten the band, the screw can subsequently be further rotated to compress the helical coil spring and thereby store energy in the coil spring for use in automatically tightening the clamp should the hose creep to a smaller diameter.

2. A hose clamp as claimed in claim 1 in which the helical coil spring has a square cross-section.

3. A hose clamp as claimed in claim 1 in which said means coupling the cover to the base comprises a plurality of tabs on the base and the cover being formed to define corresponding slots, the tabs passing through the slots and shaped to remain lodged in the slots.

* * * * *